United States Patent [19]

Reynolds

[11] 4,422,110
[45] Dec. 20, 1983

[54] METHOD AND APPARATUS FOR MULTI-TRACK DATA TRANSLATION ON A DISC

[75] Inventor: Robert S. Reynolds, Boise, Id.

[73] Assignee: Hewlett-Packard Company, Palo Alto, Calif.

[21] Appl. No.: 296,083

[22] Filed: Aug. 25, 1981

[51] Int. Cl.³ .................. G11B 19/02; G11B 21/08
[52] U.S. Cl. .................................... 360/69; 360/22; 360/48; 360/78
[58] Field of Search .................. 360/69, 78, 48, 22, 360/23, 47, 61, 63

[56] References Cited

U.S. PATENT DOCUMENTS

| | | | |
|---|---|---|---|
| 3,831,191 | 8/1974 | Gold | 360/22 |
| 4,001,883 | 1/1977 | Strout et al. | 360/48 |
| 4,005,483 | 1/1977 | Kuwano | 360/69 |
| 4,152,695 | 5/1979 | Democrate et al. | 360/47 |
| 4,229,808 | 10/1980 | Hui | 360/48 |
| 4,357,635 | 11/1982 | Hasegawa | 360/48 |

FOREIGN PATENT DOCUMENTS 2045479 10/1980 United Kingdom .................. 360/48

OTHER PUBLICATIONS

H. J. McLaughlin, Disc File Memories, Instruments and Control Systems, Nov. 1961, pp. 2063-2068.

*Primary Examiner*—Alfred H. Eddleman
*Attorney, Agent, or Firm*—William H. MacAllister; F. D. LaRiviere

[57] ABSTRACT

Data representations are translated on a rotating disc utilizing multiple transducers at different radial positions. The disc is logically formatted into selected concentric bands. Within each band data representations are translated alternately in a repetitive sequence among a selected number of transducers characteristic of the particular band. By appropriately selecting band format parameters and increasing the characteristic number of transducers as a function of decreasing band radial position the track data density may be maintained within selected limits.

6 Claims, 2 Drawing Figures

METHOD AND APPARATUS FOR MULTI-TRACK DATA TRANSLATION ON A DISC

BACKGROUND OF THE INVENTION

This invention relates to an improved method and apparatus for translating data representations on a rotating disc.

With conventional translating techniques data representations are translated on a rotating disc by a transducer which moves to different positions along a radial arc of the disc. As a result data is translated on concentric circular tracks. The tracks on the disc surface area included within any given angular rotation of a radius are known as sectors and the track length within any given sector is a function of the radius of the track. The rate at which data is supplied to the transducer is called the data rate. The data rate is typically constant for a given system. Because of the critical role of timing in high speed, high density translating of data, the rotational speed of the disc, called spindle speed, is also constant.

Fixed data rate and spindle speed together with disc geometry have traditionally dictated an inefficient distribution of data on the disc. Track data density, i.e., bits of data per unit of track length, is lowest in the outermost tracks. As track diameter decreases track data density increases until it reaches an operational limit within the translating system. At this point, the remaining inner portion of the disc is left unused. Once the innermost track radius and the data density of the innermost track are established the density of data in each track having a greater radius varies inversely with the ratio of the radii of that outer track and the innermost track. Or, stated another way, with both a fixed data rate and a fixed spindle speed each track receives the same quantity of data with track data density dependant upon the circumference of the track. Thus, outer diameter tracks are not utilized to their potential capacity for storing data.

A central concern to disc translating systems is maximizing the data stored per disc with the ultimate goal being reduction in the cost of storing data. With conventional disc translating techniques net data per disc surface is maximized when the diameter and hence track length, of the outermost track is twice that of the innermost track. At this ratio the data density of the outermost track is one half that of the innermost track. Assuming that the innermost track is always translated at a data density equal to the acceptable operational limit of the translating system, data storage gained by the addition of tracks having smaller diameters is out weighed by the data storage lost to lower data density in the longer outer diameter tracks. Thus, the quantity of data stored on a disc surface could be increased if track data density could be controlled to more closely approach the maximum data density for each track of the disc surface.

SUMMARY OF THE INVENTION

Now in accordance with the preferred embodiment of the present invention, a rotating disc employs multiple track translating techniques. The multiple track method of translating on a disc may employ a single transducer element which alternately translates on a plurality of tracks or multiple transducer elements which simultaneously or alternately translate on a plurality of tracks or any combination of these techniques.

Multiple track translating techniques distribute data over a greater number of tracks. Hence, doubling the number of tracks being alternately translated on reduces data density in each track by half. Alternate translating of data among a differing number of tracks provides a method of controlling data density without varying the data rate or spindle speed. When decreasing track diameter results in increasing data density which approaches a system limitation a transition can be made to reduce data density by increasing the number of tracks upon which data is alternately translated. A few such transitions can yield significant increases in the efficiency with which data is stored on a disc. The methods in accordance with the preferred embodiment are equally applicable to magnetic, optical, electrostatic and other techniques of translating data representations on a rotating disc.

The present invention provides a more efficient method of enlarging the storage capacity of a rotating disc which utilizes the inner data tracks thereby increasing the quantity of data stored on the disc surface without increasing the disc diameter. The present invention also provides a method of controlling data density without varying the data rate or spindle speed. A simple transducer head configuration is used in a disc memory device wherein two or more heads are used alternately to translate data into a plurality of data tracks heretofore unusable.

DESCRIPTION OF THE PREFERRED EMBODIMENT

Figure 1:
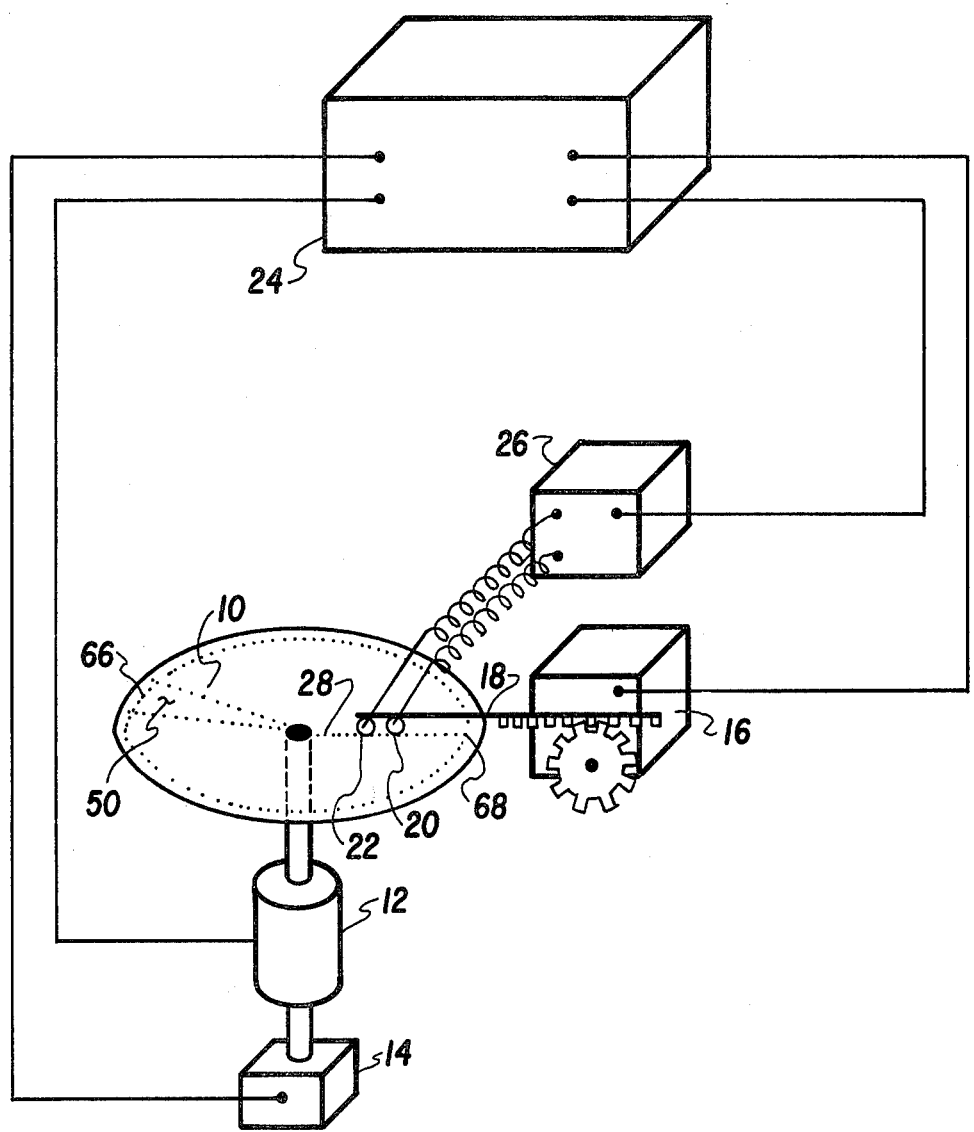
FIG. 1 shows a simplified perspective view of the basic elements of a multi-transducer disc translating system.

Referring to FIG. 1 there is shown a simplified perspective view illustrating the basic elements of a multi-transducer disc translating system. A disc 10 is driven by a motor 12 at a substantially constant angular velocity. An angular position sensing device 14 senses the disc's speed and angular position for communication to a controller 24. The controller 24 is programmed with instructions for formating data locations on the disc 10. An arm 18 is extended or retracted by an actuator arm positioning mechanism 16 in response to an instruction from the controller 24. Transducers 20 and 22 attached to said actuator arm 18 are hence positioned at any of a plurality of preselected positions along a radial line 28 (shown dotted). The translating system as described so far in this embodiment is similar to conventional disc memory systems. Data is translated to and from specific disc locations under the direction of the controller 24 which coordinates the timing of data translation with the position of a single transducer (either 20 or 22) and the angular position of the disc 10.

The preferred embodiment differs from conventional disc translating systems in that two or more transducer heads, writing alternately, are utilized to translate data onto a plurality of heretofore unusable data tracks. The use of a controller 24 to instruct a data directing device 26 to select a specific transducer in a repetitive sequence from among a plurality of transducers, such as 20 and 22, in a preselected format which is a function of transducer radial position and disc angular position, enhances the efficiency with which data locations may be positioned on a disc.

Figure 2:
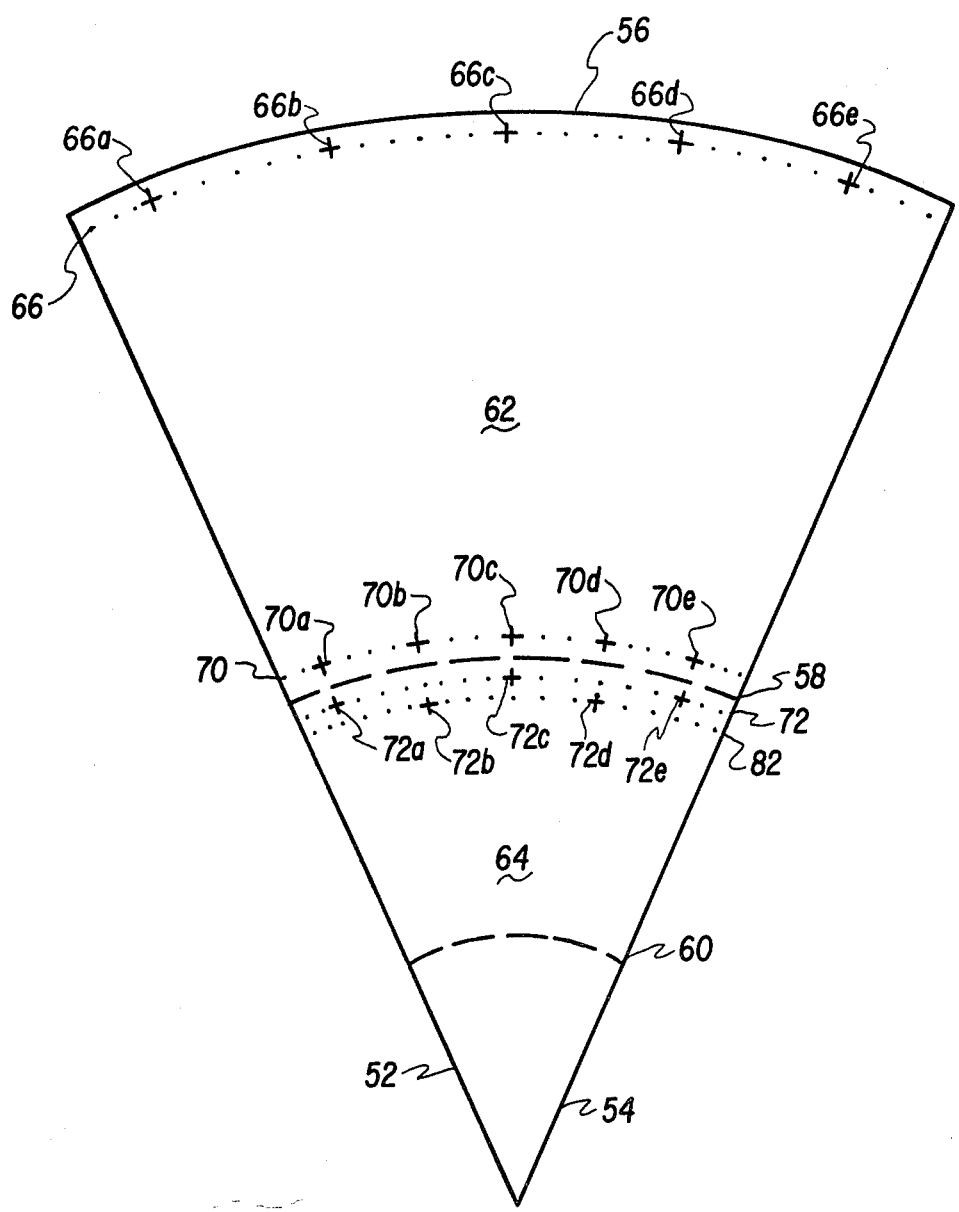
FIG. 2 shows a view of a disc sector with representative formats of data locations available with a multi-transducer translating system.

To better understand the preferred embodiment it is helpful to first become familiar with the constraints which disc geometry imposes upon the format of data locations on a disc. FIG. 2 depicts a disc sector 50 between radial lines 52 and 54. The boundary 56 represents the outer edge of the disc sector 50. Attention will be directed first to data locations within the first selected band 62 bounded by the outer edge 56 and the radial arc 58 (shown as a segmented line). The format of data locations within the first selected band 62 will illustrate the capabilities and limitations of conventional single transducer translating systems. Attention will next be directed to the format of data locations within the second selected band 64 bounded by radial arcs 58 and 60. The format of data locations within the second selected band 64 will illustrate the unique capabilites of the multi-transducer translating system of the preferred embodiment. Finally, the combination of the data location formats within the first 62 and second 64 selected bands will illustrate the data translating method of the preferred embodiment.

As shown in FIG. 1, a transducer 20 positioned at a fixed radial position 68 (along radial line 28) relative to the rotating disc 10 will "see" a circular area 66 (dotted line) on the disc. 10. In FIG. 2 the arc 66 (dotted line) represents the path of the transducer 20 (not shown in FIG. 2) relative to the disc sector 50. Data locations 66a, 66b, 66c, 66d, and 66e in FIG. 2 represent the format of data locations along arc 66 caused by the sequential translation of the data representations at a preselected periodic translation rate by a transducer as the disc sector 50 rotates at a preselected angular velocity beneath the transducer. The locus of data locations 66a through 66e along the circular line 66 is called a track. The number of data locations per linear unit of track length is called track data density. Sequential data locations 70a, 70b, 70c, 70d, and 70e represent the format of data locations along a track 70 with a smaller radius within the first selected band 62. Note that the track data density has substantially doubled in track 70 relative to track 66 because of the combined constraints of disc geometry, fixed data translation rate and fixed disc angular velocity.

Conventional disc translating systems are confined to data location formats in which each successive track with a smaller radius has a greater track data density. If it is assumed that the spacing of two adjacent data locations in track 70, e.g., 70a and 70b, are as close as the translating system will permit (i.e., maximum track data density) then the first selected band 62 illustrates the data location format of a disc on a conventional translating system. There would be many tracks spaced between tracks 66 and 70. Track data density would be lowest in the outermost track 66 and would increase as a function of decreasing track radius until maximum track data density is reached in track 70. Conventional translating systems such as this are confined to inefficient data location formats in two ways. First, the system is incapable of storing data at disc locations with radii less than that at which maximum data density is reached. Second, efficient distribution of data locations is decreased because the outermost tracks are limited to track data densities substantially below the system's maximum data density. Increasing the track data density of the outer tracks in the first selected band 62 increases the radius of the track at which maximum data density occurs. It can thus be shown that with conventional disc translating techniques net data per disc side is maximized when the outermost track is twice the radius of the innermost track and the innermost track's data density track is equal to the system's maximum data density. The first selected band 62 illustrates these conditions.

The preferred embodiment of the disclosed invention overcomes many of these limitations. In the second selected band 64 two transducers 20 and 22 (not shown in FIG. 2) are positioned respectively over two tracks 72 and 82. Sequential data locations 72a in track 72, 72b in track 82, 72c in track 72, etc., illustrate the format of data locations resulting from the controller 24 (in FIG. 1) instructing the data directing device 26 to alternately cause transducers 20 and 22 to translate data representations at the preselected translating rate onto the disc 10 rotating at the preselected angular velocity. Note that the track data density in tracks 72 and 82 is substantially half the track data density of track 70. As the track radii within the second selected band 64 approach a radius equal to one half that of tracks 72 and 82 the track data density in the second selected band will again approach the maximum track data density permitted on the disc. At this radius a third selected band could utilize three or more transducers to again reduce track data density at yet smaller radii.

The combined effect of the data location formats in the first 62 and second 64 selected bands is an illustration of a method of translating data representations at a fixed translating rate on a disc rotating at a fixed angular velocity which overcomes some of the data density constraints imposed upon similar conventional translating systems. Alternate preferred embodiments which accomplish the same method could comprise more than two transducers, buffer storage combined with substantially simultaneous translation on two or more transducers or in the area of optical translating systems a laser which is alternately directed among a plurality of tracks.

Additionally, the ability to change track data density free from the constraints of conventional disc translating systems allows for formats of data locations on the disc which include track data densities in the longer outer radius tracks which approach the maximum allowed track data density. It should also be recognized that multiple tracks being alternately translated to, e.g., tracks 72 and 82 in the second selected band 64 need not be adjacent to each other. If, for example, there are nine tracks intervening between tracks 72 and 82, then, controller 24 could be programmed to skip to tracks 92 and 102 after translation to tracks 81 and 91 has been completed.

I claim:

1. Data translating apparatus having a plurality of translating modes comprising:
   a memory disc having a plurality of concentric circular tracks for storing data representations at a plurality of locations along the tracks;
   a disc drive means, coupled to the disc, for rotating the disc at a predetermined constant angular velocity;
   a sensing means coupled to the disc drive means to produce signals representing disc angular position and speed;
   an actuator arm;

a positioning means, coupled to the actuator arm, for positioning the actuator arm radially on the disc;

at least two transducer means mounted on the actuator arm for translating data representations onto the disc at a plurality of locations along the tracks;

a mode selecting means, coupled to the sensing means and the transducer means, for selecting a plurality of translating modes including a first and second translating mode in response to signals representing disc angular position and speed and as a function of track radius, said first mode being the translation of data representations onto one track, and said second mode being the translation of the same quantity of data representations alternately onto a selected number of tracks in a predetermined repetitive sequence as is translated onto one track in the first mode.

2. A method of translating data representations onto a rotating disc having a plurality of concentric tracks thereon, comprising:

dividing the tracks into a plurality of concentric bands, each band containing a predetermined number of tracks; and rotating the disc at a constant angular velocity; and producing signals representing disc angular position and speed; and positioning transducer means coordinated with signals representing disc angular position and speed on the tracks in a first selected band for translating data representations onto one track at a constant rate in a predetermined repetitive sequence; and positioning transducer means coordinated with the signals representing disc angular position and speed on tracks in a second selected band for translating data representations onto a selected number of tracks at said constant rate in a predetermined repetitive sequence whereby substantially the same quantity of data representations is translated onto the selected number of tracks in the second selected band as is translated onto one track in the first selected band.

3. The method of claim 2 wherein the translating of data representations occurs alternately on more than one of said selected number of tracks in a predetermined repetitive sequence.

4. The method of claim 2 or claim 3 wherein each selected number of tracks comprise a group and the repetitive sequence of translating data representations on said selected number of tracks is sequentially repeated on successive groups of tracks within the selected band.

5. The method of claim 2 or claim 3 wherein the selected number of tracks which comprise a group within a first selected band is less than the selected number of tracks which comprise a group within a second selected band.

6. The method of claim 5 wherein the number of tracks comprising a group selected for the first selected band is one and the number of tracks comprising a group selected for the second selected band is two and the radius of the last track of the first selected band is greater than the radius of the first track of the second selected band.

* * * * *